(12) United States Patent
Conti et al.

(10) Patent No.: US 7,626,571 B2
(45) Date of Patent: Dec. 1, 2009

(54) WORKSPACE EXPANSION CONTROLLER FOR HUMAN INTERFACE SYSTEMS

(75) Inventors: Francois Conti, Menlo Park, CA (US); Oussama Khatib, Stanford, CA (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 588 days.

(21) Appl. No.: 11/645,210

(22) Filed: Dec. 22, 2006

(65) Prior Publication Data

US 2007/0171194 A1    Jul. 26, 2007

Related U.S. Application Data

(60) Provisional application No. 60/753,480, filed on Dec. 22, 2005.

(51) Int. Cl.
  *G09G 5/00* (2006.01)
(52) U.S. Cl. .................................. 345/156; 345/157
(58) Field of Classification Search ............ 345/156, 345/157, 159–161, 163, 169, 173, 179, 184
  See application file for complete search history.

(56) References Cited

U.S. PATENT DOCUMENTS

| | | | |
|---|---|---|---|
| 5,745,910 A * | 4/1998 | Piersol et al. ............. 715/210 |
| 5,812,862 A * | 9/1998 | Smith et al. ............... 715/209 |
| 5,835,919 A * | 11/1998 | Stern et al. ............... 715/209 |
| 6,252,579 B1 | 6/2001 | Rosenberg et al. | |
| 6,288,705 B1 | 9/2001 | Rosenberg et al. | |
| 6,289,299 B1 * | 9/2001 | Daniel et al. .............. 703/21 |
| 6,292,174 B1 | 9/2001 | Mallett et al. | |
| 6,396,509 B1 * | 5/2002 | Cheng ..................... 715/706 |
| 6,448,977 B1 | 9/2002 | Braun et al. | |
| 7,295,610 B2 * | 11/2007 | Schoenblum ......... 375/240.03 |
| 2002/0010571 A1 * | 1/2002 | Daniel et al. .............. 703/21 |
| 2004/0028143 A1 * | 2/2004 | Schoenblum ......... 375/240.25 |

* cited by examiner

*Primary Examiner*—Ricardo L Osorio
(74) *Attorney, Agent, or Firm*—Lumen Patent Firm

(57) ABSTRACT

A workspace expansion controller for human interface systems is provided. The controller resolves the physical workspace constraint by relocating the physical workspace of the device mapped inside the environment (virtual or robot) towards the area of interest of the operator without disturbing his or her perception of the environment. The controller is based on the fact that people are greatly influenced by what they perceive visually and often do not notice small deviations in their hand unless that small deviation has a corresponding visual component. With this new control approach the operator can explore much larger workspaces without losing spatial resolution through high scaling factors and thus avoid the drawbacks of indexing common with current approaches.

19 Claims, 12 Drawing Sheets

WORKSPACE EXPANSION CONTROLLER FOR HUMAN INTERFACE SYSTEMS

CROSS-REFERENCE TO RELATED APPLICATIONS

This application is cross-referenced to and claims priority from U.S. Provisional Application 60/753,480 filed Dec. 22, 2005, which is hereby incorporated by reference.

FIELD OF THE INVENTION

The present invention relates generally to human interface systems. More particularly, the present invention relates to controllers for human interface systems that expand the workspace of their respective end-effectors or tracking devices.

BACKGROUND OF THE INVENTION

A haptic device allows a user to interact with a computer via the sense of touch by simulating and rendering contact forces with virtual objects. A typical interface takes the form of a miniature robot arm with sufficient linkages to allow a 2D or 3D workspace (FIG. 1). Motors or brakes control the motion of the links that are selectively constrained to represent interactions with physical objects.

The user interacts with the device via a gripper or stylus attached at the end-effector of the moveable framework and typically moves a displayed graphical object across a computer screen. Clearly the choice of the displayed object is dependant on what is being simulated and on the devices capabilities. For the purposes of this invention, one can define an avatar as a virtual representation of the user through which physical interaction with the virtual environment occurs. For instance, a surgical tool may be thought of as an avatar when simulating an intervention. A cursor, on the other hand, can be used to represent the position of the mouse being held by the operator. The operator controls the avatar's position inside the virtual environment. When contact takes place between the user's avatar and the virtual objects, action and reaction forces occur. Such forces are regulated by the type of contact supported by the avatar and by its geometry.

A haptic device is typically used as a position control device in which displacement of the end-effector is directly correlated to displacement of the avatar displayed on the screen. This displacement correlation may not be a one-to-one correspondence, since the avatar position may be scaled according to a constant mapping from the device position. For example, the device may be moved a distance of one centimeter which causes the controlled avatar to move five centimeters across the screen. In general, small displacements of the device are scaled to large motions of the avatar to allow the operator to easily reach targets in all areas of the virtual workspace environment displayed onto the computer screen.

The scaled avatar movement scheme works well for coarse motion, when large distances inside the virtual workspace need to be traversed to bring the avatar from one global area to another. Accuracy of the avatar motion is not critical for coarse motion, but for tasks in which accurate positioning of the avatar is needed, the large scaling of device movement to avatar movement makes a target acquisition task physically impossible for the user.

Ballistic tracking is typically used to alleviate the scaling problem for fine positioning of the controlled object. Ballistics refers to the technique of varying the scaling between the motion of a physical device and the motion of a displayed avatar depending upon the velocity of the device in its workspace. The assumption is that if the user is moving the interface very quickly, the user is likely to be performing a "coarse motion" task inside the virtual environment, and therefore the device controller scales small motions of the interface to large motions of the avatar. Conversely, if the user is moving the device very slowly, the user is likely to be performing a fine positioning task on the screen, and the controller scales small motions of the device to small motions of the avatar.

When using ballistics, moving the device in one direction quickly and then moving it back in the other direction slowly may create a situation where the physical device has returned to its starting position but the avatar is positioned far away from its starting position. This illustrates that the frame of the avatar and the frame of the device have shifted or become offset. If this offset becomes too large, the user may not be able to reach some parts of the virtual workspace within the range of motion of the device.

In a typical, open-workspace interface, the offset is corrected through a process called "indexing." Indexing is achieved in a typical mouse interface by lifting the mouse off the table and repositioning it after the mouse has reached the edge of its available workspace, while the cursor remains fixed in position. However, most force feedback devices are grounded to their base and require the use of an additional input device, such as a user switch for instance, to inform the controller to uncouple the device from the avatar and let the operator reposition the device at the center of its physical workspace. Unfortunately, with limited-workspace devices, indexing becomes cumbersome and highly interferes with the operator since he or she needs to constantly perform the offset correction.

Since ballistics needs indexing to restore the frame offsets, and since ballistics and indexing are both traditional mouse techniques that conflict with typical ground-based haptic devices, a more transparent solution is needed that reconciles both the ballistics and the indexing problem in force feedback interface devices without interfering with the operator.

SUMMARY OF THE INVENTION

The present invention provides a new controller for human interface systems and methods and is referred to as a workspace expansion controller or drift controller. The controller resolves the physical workspace constraint by continuously relocating the physical workspace of the device mapped inside the environment (virtual or robot) towards the area of interest of the operator without disturbing his or her perception of the environment. The controller is based on the fact that people are greatly influenced by what they perceive visually and often do not notice small deviations in their hand unless that small deviation has a corresponding visual component.

In one embodiment, the human interface system includes a human interface device, a computer system and a drift controller. The human interface device has a physical workspace and an end-effector capable of moving in the physical workspace. The computer system includes a graphical display, which defines a virtual workspace. The computer system is connected to the human interface device and the end-effector in such a way that the end-effector is capable of controlling one or more graphical objects on the graphical display within the virtual workspace. The drift controller adds drift to the position of the graphical object(s). Now the drift controller adds this drift in a direction away from a defined point in the virtual workspace (preferably, but not limited to, the center point). In one embodiment the amount of drift is defined as the product of the instant velocity of the end-effector and the offset position of the end-effector from a defined point of origin within the physical workspace (preferably, but not limited to, the center point).

In another embodiment, one could have a telerobotic system including a human interface device, a robot system and a drift controller. The human interface device has a physical workspace and an input device movable in the physical workspace. The robot system includes a robot workspace. The robot system is connected and capable of teleoperations to the human interface device and the input device in such a way that the input device is capable of controlling one or more control points on the robot within the robot workspace. Examples of control points are e.g. the position of the base of the robot on the ground, the position of one of the end-effectors (grippers) of the robot, or the position between both hands of a humanoid robot. Sending a position command to the robot's controller can control these control points. The drift controller adds drift to the position of the control point(s). Now the drift controller adds this drift in a direction away from a defined point in the robot workspace (preferably, but not limited to, the center point). In one embodiment the amount of drift is defined as the product of the instant velocity of the input device and the offset position of the input device from a defined point of origin within the physical workspace (preferably, but not limited to, the center point).

The mathematical definition of the drift controller could be varied in different ways. For example the amount of drift could be multiplied by a constant or various functions or operators could be applied to the instant velocity and/or offset. The key aspect of the invention is that the added drift by the drift controller is an imperceptible drift to the user operating the end-effector. In other words, the added drift should not and does not disturb the perception of the graphical object within the virtual workspace. In one embodiment, the added drift is below 5 m/s with respect to the physical workspace.

The workspace drift controller presented herein has proven to significantly improve workspace usage of haptic interfaces without introducing visual or haptic artifacts to the operator when reasonable drift factors are chosen. When the user's hand moves at a velocity of 1 m/s, the drift factor may range from 0 to 60% of the actual hand motion. In other words, if the user moves the end-effector along a path of length 10 centimeters, a drift of up to 6 centimeters can be introduced without affecting the user's perception of the environment. The maximum magnitude of the drift is also linearly coupled to the velocity of the user's hand and therefore at 0 m/s, no drift (0%) should occur, but at much higher velocities (>1.0 m/s), the drift factor can expand the 60% limit.

With this new control approach the operator can explore much larger workspaces without losing spatial resolution through high scaling factors and thus avoid the drawbacks of indexing. The drift controller has applications to haptic system and non-haptic systems such as tracking devices (mechanical, optical or electromagnetical devices), touch pads, trackballs, pointing sticks, lightpens, joysticks, head pointers, eye tracking devices, digitizing tablets (which use a stylus) and data gloves that translate the user's movements to computer gestures. In practice, the drift controller can be applied to any system, which provides some position information in reference to a known origin.

BRIEF DESCRIPTION OF THE FIGURES

The present invention together with its objectives and advantages will be understood by reading the following description in conjunction with the drawings, in which.

DETAILED DESCRIPTION OF THE INVENTION

The following description first discusses in more detail the position control and ballistic control approaches. It then discusses another approach referred to as rate control. Following these discussions the new control mechanism of the invention is discussed along with examples and variations.

Position Control

Position control is one of the most common control paradigms used with computer mice or haptic interfaces, and refers to a mapping in which displacement of the device in physical space directly dictates displacement of the avatar in virtual space. The mapping can have an arbitrary scale factor, but the fundamental relation between mouse displacements and graphical object displacements should be present.

Figure 1:
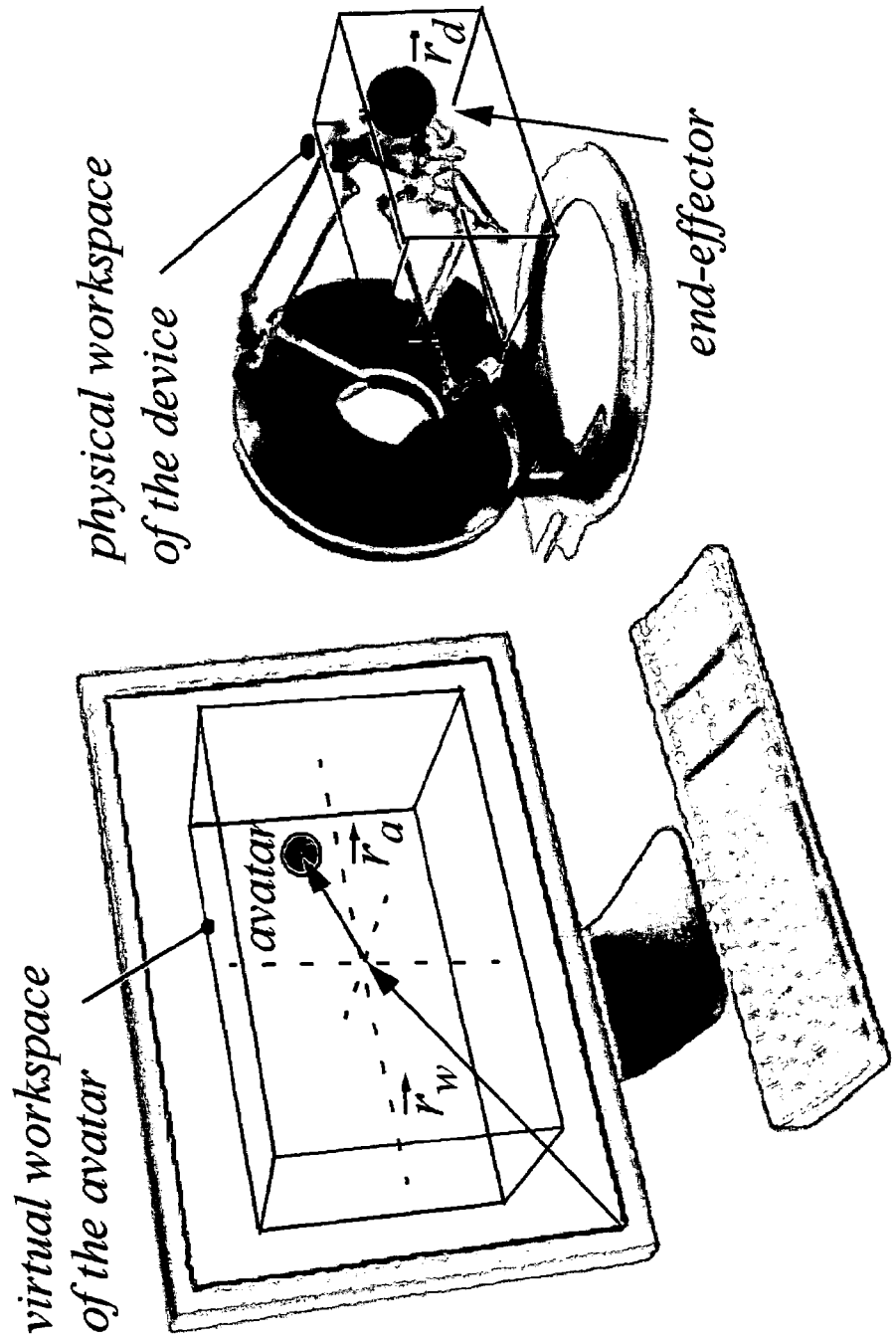
FIG. 1 shows a typical 3-degrees-of-freedom haptic interface connected to a computer and controlling the position of an avatar inside a virtual simulated environment. $\vec{r}_w$ is the location of the virtual workspace inside the virtual environment. $\vec{r}_a$ is the position of the avatar within the virtual workspace. $\vec{r}_d$ is the position of the end-effector in reference to the device base.

In an absolute device-to-world mapping (see FIG. 1), there is a direct correspondence between the boundaries of the device workspace and the boundaries of the virtual workspace as expressed in Eq. 1. The increments of the device position are mapped directly to the virtual workspace with a scaling factor $k_s$. The dimensions of the workspace of the haptic interface can directly correspond to the dimensions of the virtual workspace. If the working volume of the virtual environment is changed, then the scaling factor can be changed to maintain the direct correspondence.

$$\vec{r}_a = k_s \cdot \vec{r}_d + \vec{r}_w \qquad \text{Eq. 1}$$

While this approach allows the operator to navigate through larger virtual environments with smaller haptic interfaces, using a large-scale factor reduces the operator's ability to perform fine displacements of the avatar. When force feedback capabilities are engaged, the loss of spatial resolution inside the virtual environment seriously affects haptic performance and stability.

Ballistic Control

Ballistics addresses the loss of spatial resolution when large scale factors $k_s$ are used by defining a mapping that is dependent on the velocity that the device is currently traveling at in the interface workspace. Ballistics helps to provide accurate control of an avatar when the user wishes to coarsely position the controlled object, e.g. move a mouse cursor from one object on the screen to another across a large region of the screen. This type of control requires that the avatar be very sensitive to device movements so that the avatar will fly rapidly across the screen.

Figure 2:
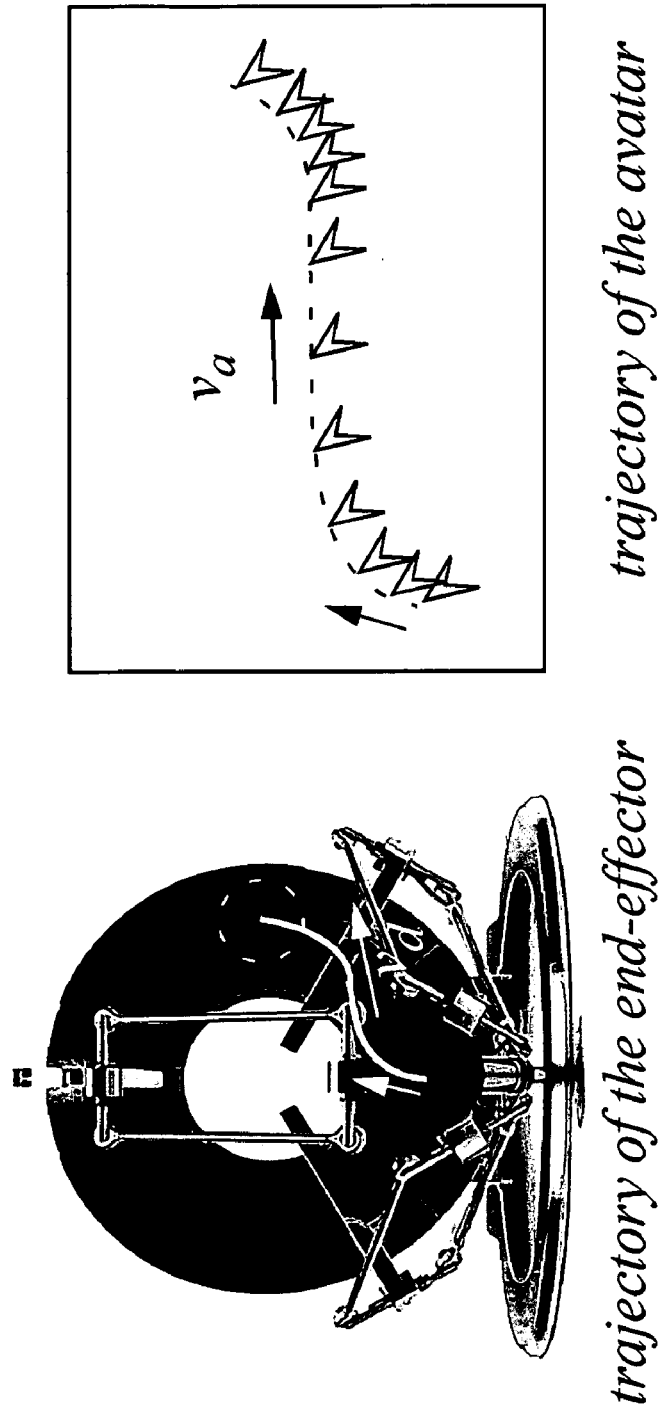
FIG. 2 shows a prior art example of ballistic control. Under ballistic control strategy, faster motions of the device's end-effector translate into larger displacements of the avatar.

Ballistics also helps to provide accurate control of an avatar when the user wishes to finely position the controlled object, e.g. to home in on a particular position. This type of control requires the avatar be less sensitive to device movements to allow fine motions. Often, the operator combines both methods in a single device movement: first the user swings the avatar quickly into a general region and then he or she homes the avatar in on the target, back-tracking to the target if the avatar overshoots the target. When the device is moved quickly, ballistics assumes that coarse positioning of the cursor is desired and a large distance is mapped to the avatar (FIG. 2). When the device is moved more slowly, ballistics assumes that a finer positioning of the avatar is desired and therefore a smaller distance is mapped for the same motion of the interface.

Eq. 2 expresses the relative mapping between the motion of the avatar and the device during a time interval of dt where $d\vec{r}_a$ represents the distance through which the haptic device has been moved and represents the distance that the avatar covers during that same period of time. $k(v_d)$ is a constant that increases slightly based on the current velocity of the device, as explained above.

$$d\vec{r}_a = k \cdot (v_d) \cdot d\vec{r}_d \qquad \text{Eq. 2}$$

Rate Control

Rate control is also a commonly used control strategy that refers to a mapping in which the position of the interface is abstractly mapped to move some kind of mechanism or object. In a computer haptic simulation, where rate control is applied, there is not a direct physical mapping between the physical device motion and the avatar motion. Thus, rate control paradigm is fundamentally different from position control in that the interface can be held steady at a given position but the controlled avatar is in motion at a commanded or given velocity, while the position control paradigm only allows the controlled computer object to be in motion if the interface device is in motion. For example, a common form of rate control is a velocity derived abstraction in which displacement of the user object dictates a velocity of the computer object, such as a vehicle or other graphical object displayed on the screen. The further the device is moved from the original position, the greater the velocity of the controlled avatar. Such control paradigms are very popular in robotic teleoperation where velocity (or acceleration) of a vehicle is dictated by the displacement of, for example, a joystick.

Eq. 3 expresses the displacement $d\vec{r}_a$ of an avatar under rate control during a period of time dt. $\vec{r}_{d0}$ corresponds to the device origin position at the center of its physical workspace and $\vec{r}_d$ to the current position of the device.

$$d\vec{r}_a = k_r \cdot (\vec{r}_d - \vec{r}_{d0}) \qquad \text{Eq. 3}$$

While rate control strategies allow users to control a simulated object through an infinite workspace without the disadvantages of indexing, such control paradigms also act as low pass filters in position control and remove the ability for the operator to perform fast motions of the avatar in different directions. Thus haptic tasks like scratching a rough surface or tapping against a hard object are no longer possible using such control models.

Workspace Drift Control

An essential observation about human perception is that people are greatly influenced by what they perceive visually and often do not notice small deviations of their hand or other physical members of their body in physical space unless that small deviation has a corresponding visual component. These small deviations can range from 0 to 2-3 centimeters for motions of the fingers for instance. For larger motions of other body parts such as the hands, arms or legs, these values may range from 0 to 30-50 centimeters depending of the kind of motion performed.

In the new control strategy of the present invention, this observation about human perception is utilized to create an imperceptible drift of the physical workspace of the haptic device towards the area of interaction of the avatar. Slowly shifting the workspace of the device when the avatar is in motion instigates the user to unconsciously correct for this added drift while executing at the same time a task with the device.

To ensure that the workspace drift remains imperceptible to the user several conditions are required:

Firstly, a workspace added drift may only occur when the user's hand is in motion, otherwise the user would perceive such drift as an unrelated event to the motion of his or her hand.

Secondly, the velocity of the workspace drift should remain proportional to the velocity of the user's hand so that the magnitude of the spatial distortion between the physical and visual experience remains below a boundary level which is discussed below.

Finally a small drift of the workspace should not create any large variations of forces at the end-effector, which would be perceived as perturbations by the operator.

In one embodiment, the added drift is below 5.0 m/s. It is important to note that this drift rate refers to the physical workspace of the device and not to the workspace (virtual or robot) since the latter could be programmed with any imaginary units such as mm, m, km, etc.

Figure 3:
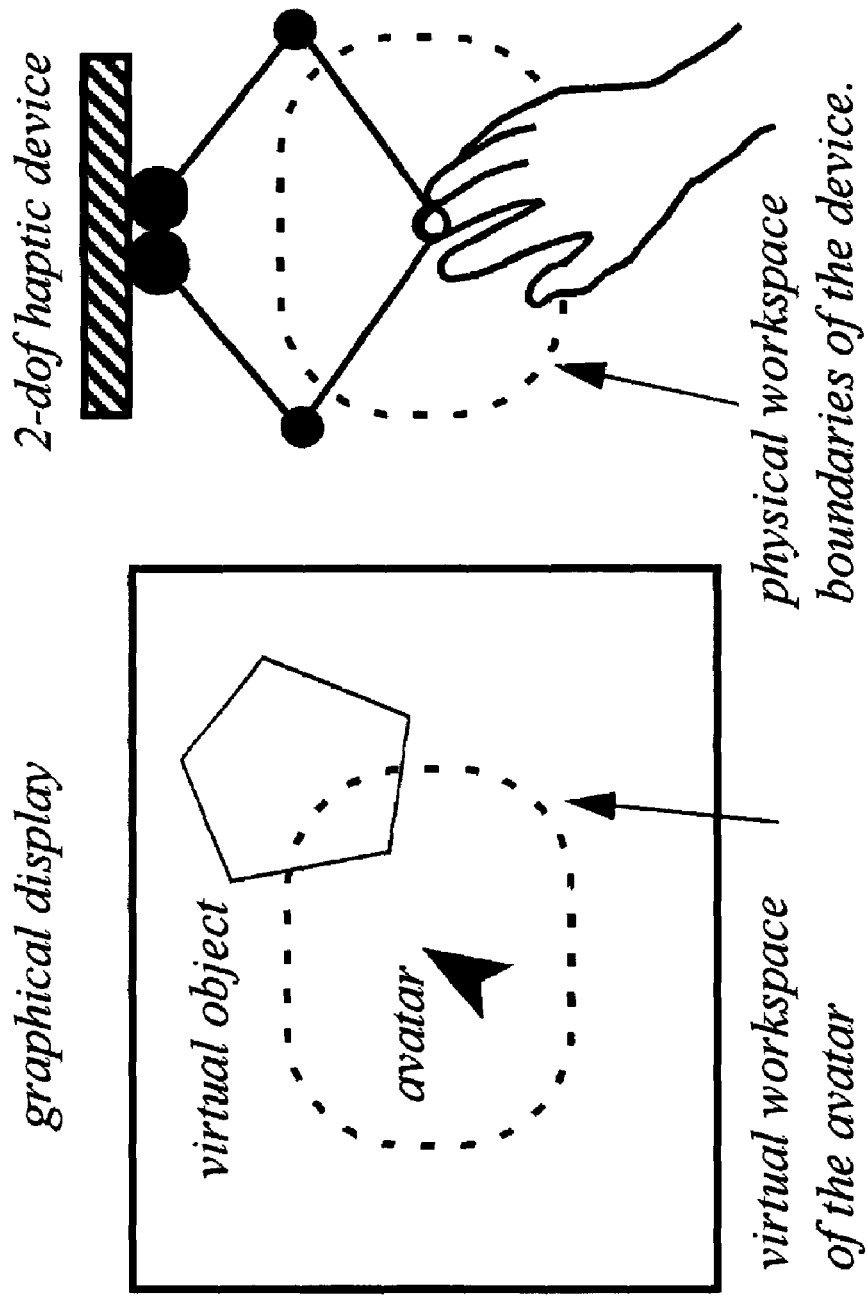
FIG. 3 shows, according to the present invention, the hand of the operator holding the end-effector of a human interface device (e.g. haptic device or non-haptic device), which is positioned at the center of its physical workspace. The physical workspace is mapped inside the virtual environment (virtual workspace or graphic display) and partially includes the virtual object.

FIGS. 3-6 show an exemplary model of a 2 degrees-of-freedom haptic device to demonstrate the invention. The same principles could be used with a 3 or more degrees-of-freedom device as discussed below. FIG. 3 shows the hand of a user holding an end-effector located at the center of the physical workspace of the device. The device directly dictates the position of the avatar as described in Eq. 1.

To preserve the first two conditions stated above, the velocity of the workspace drift $\vec{v}_{wd}$ is defined by multiplying the instant velocity $\vec{v}_d$ of the device by its current offset position $(\vec{r}_d - \vec{r}_{d0})$ from its point of origin. In one embodiment, this result could be multiplied by a scalar $k_d/R$ where R corresponds to the radius of the smallest sphere that encloses the device workspace and where $k_d$ expresses the drift factor which dictates the maximum level of distortion between the visual and physical representation when the device is located at the edge of its physical workspace. In another embodiment, $k_d/R$ could also be represented by a single scalar K or a different constant K.

$$\vec{v}_{wd} = \frac{k_d}{R} |\vec{v}_d| \cdot (\vec{r}_d - \vec{r}_{d0}) \qquad \text{Eq. 4}$$

The velocity of the virtual workspace drift (Eq. 5) is obtained by multiplying the device workspace drift by the scaling factor $k_s$. Once the position $\vec{r}_d$ of the workspace updated one can compute the position of the avatar $\vec{r}_a$ is computed using Eq. 1.

$$\vec{v}_{wa} = k_s \vec{v}_{wd} \qquad \text{Eq. 5}$$

Figure 4:
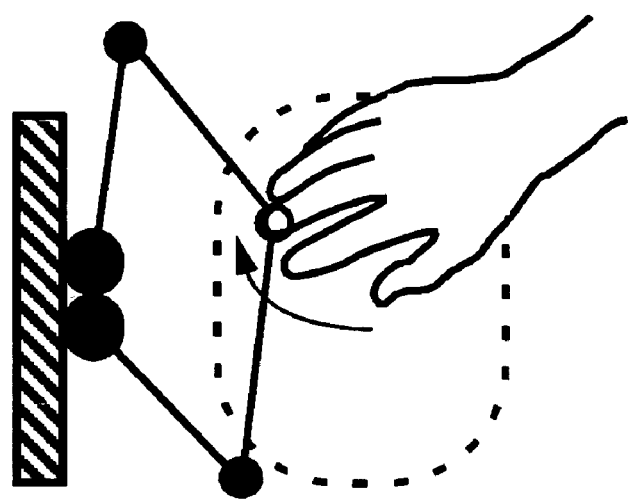
FIG. 4 shows, according to the present invention, the operator moving the avatar toward the virtual object. At the same time the device reaches the border of its physical workspace.
Figure 4:
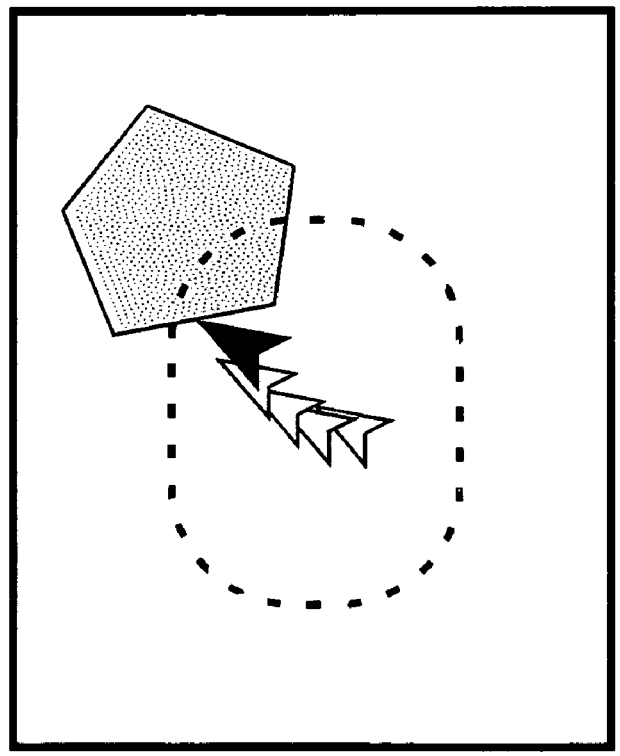
Figure 5:
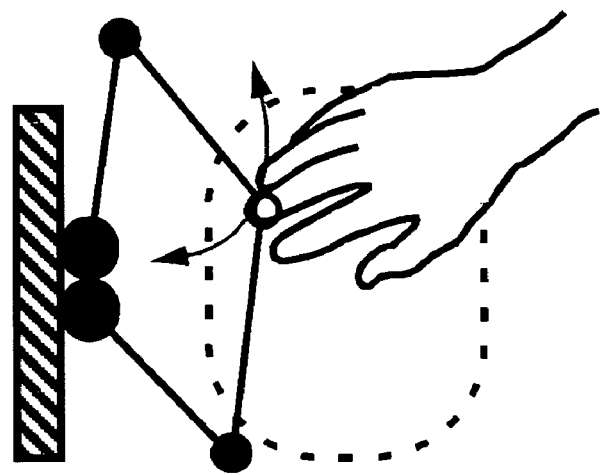
FIG. 5 shows, according to the present invention, the operator interacting locally with the virtual object. The virtual workspace drifts towards the avatar.
Figure 5:
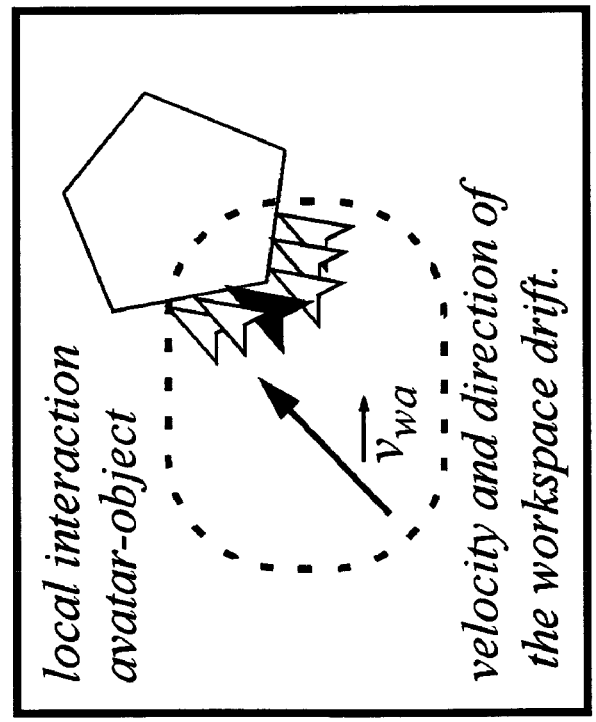
Figure 6:
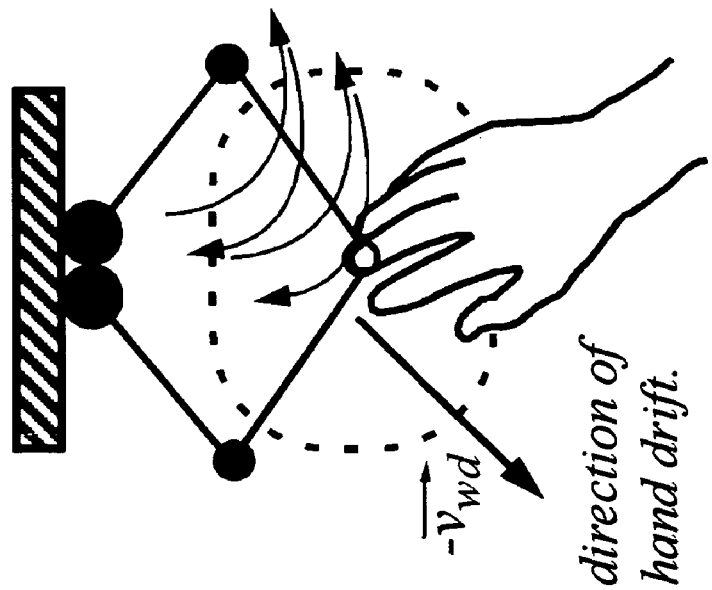
FIG. 6 shows, according to the present invention, the workspace drift that instigates the operator to move his or her hand towards the center of the workspace of the device.
Figure 6:
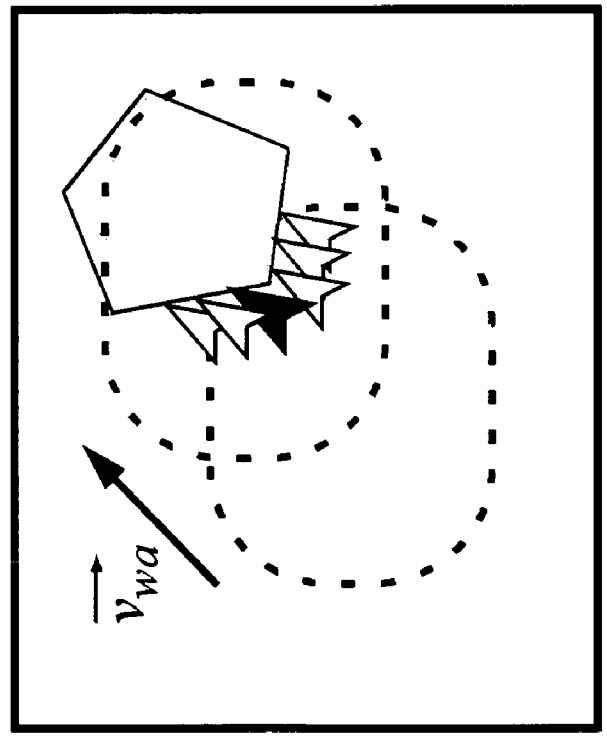
Figure 7:
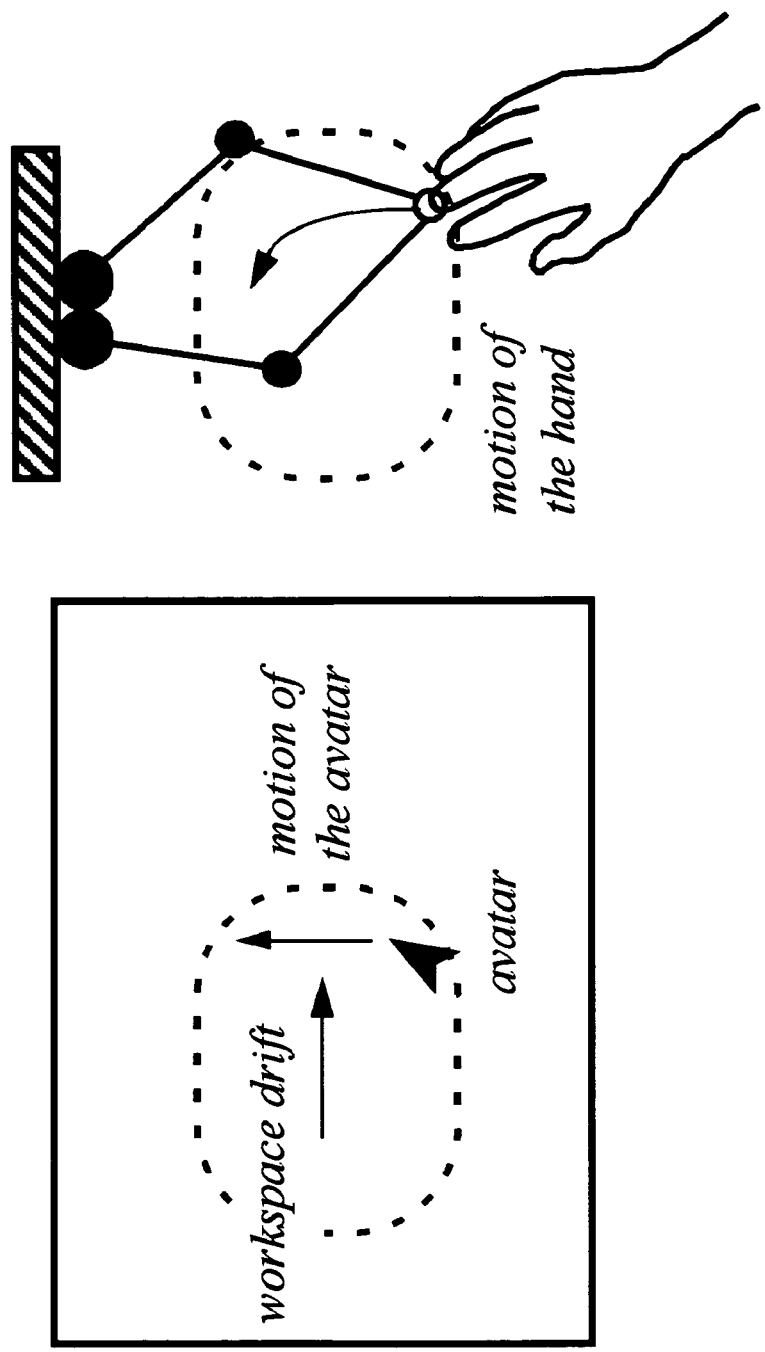
FIG. 7 shows, according to the present invention, that moving an avatar along a straight line during a workspace drift requires compensating for the shift by slightly moving the end-effector in the opposite direction of the workspace drift.

In FIG. 4 the operator moves the end-effector towards the edge of the physical workspace of the device. This displacement is directly mapped to the avatar, which moves towards the virtual object in the scene. FIGS. 5-6 show the user locally interacting with the virtual object. This task is illustrated by small motions of the avatar in different directions around the edges of the virtual object. During this time the controller progressively moves the workspace of the device towards the avatar, therefore restoring the device at the center of its physical workspace. When the device is located near its origin the drift is negligible but its amplitude increases noticeably once the user moves towards the edges of the workspace creating an important distortion between the motion of the operator's hand and that of the avatar. The drift factor is expressed by $k_d$ and represents the maximum bend that can occur when the workspace drift is perpendicular to the motion of the end-effector and when the end-effector reaches the edges of the workspace. This situation is illustrated in FIG. 7.

EXAMPLE

Figure 8:
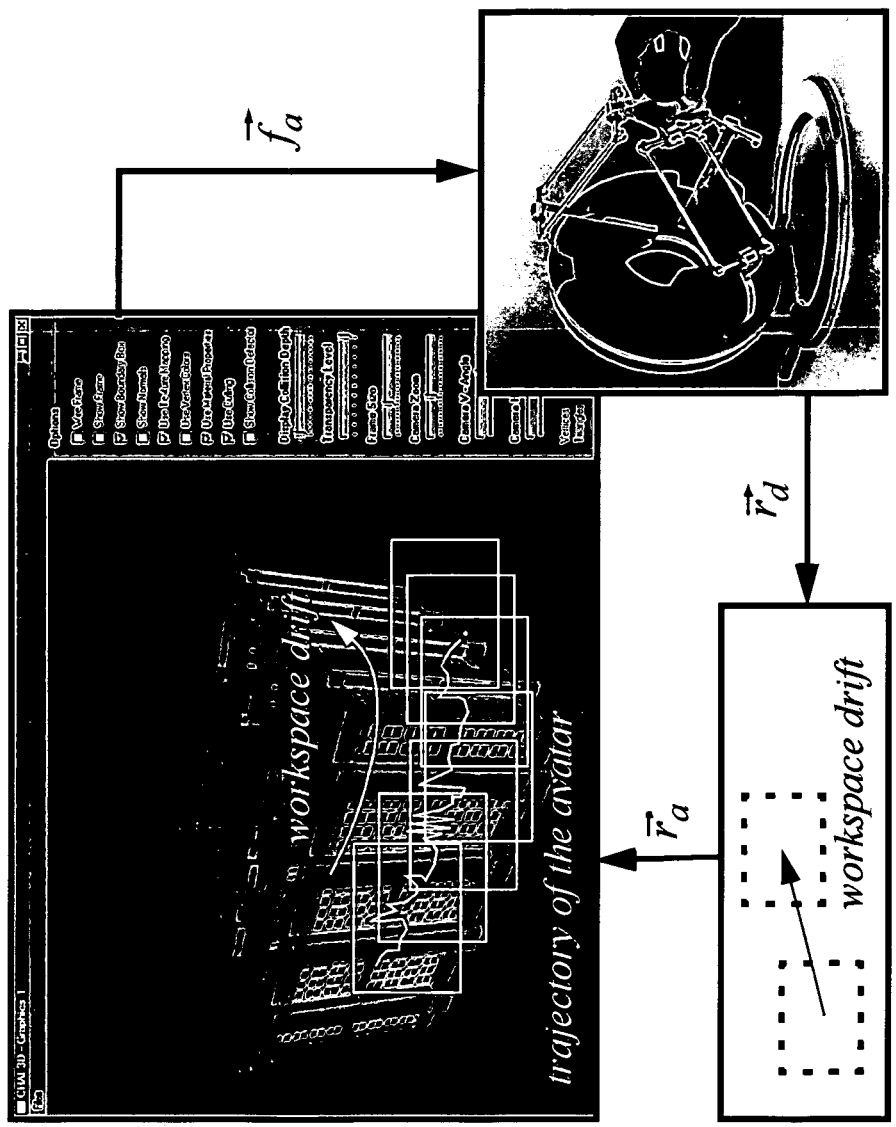
FIG. 8 shows, according to the present invention, an example in a 3-dimensional environment. The virtual workspace is constantly relocated towards the avatar thereby maintaining the user's hand near the center of the physical workspace of the device.

The workspace drift controller was directly integrated within the software drivers of an Omega Haptic device. Initial experiments were performed by manipulating large objects inside a 3 degrees-of-freedom Haptic Viewer, which integrated a finger-proxy type haptic rendering algorithm. Since the dimensions of the virtual objects were up to 10 times the size of the actual workspace of the avatar (see FIG. 8), without using the workspace drift control algorithm, the user could only explore a very small portion of the environment (1/10th). When the workspace drift controller was engaged, the user could gradually explore further portions of the scene. The drift can go on forever and therefore the user can gradually move to regions inside the virtual workspace, which are located at a very far distance from the point of origin where the user started.

As presented in Eq. 4, the workspace drift rate is regulated by $k_d$ which-directly dictates the maximum level of distortion between the physical and visual representations at the edge of the physical workspace of the device. We provided a slide bar to the user to adjust the drift gain $k_d$. Results showed that for a 3 degrees-of-freedom Omega Haptic Device with a physical workspace radius of R=0.075 m (75 mm), a distortion factor of 30% ($k_d$=0.3) was unnoticed by the operators. Beyond this limit ($k_d$>0.3) haptic artifacts were observed when the user was interacting with virtual objects. If a workspace drift occurred during this time, the user would experience a slip: the sensation of the object sliding under his or her hand.

To allow the user to cross large regions of the workspace, ballistic control could also be integrated with a drift controller whereby the ballistic controller could only be triggered when fast motions of the device occur.

Variations

Figure 10:
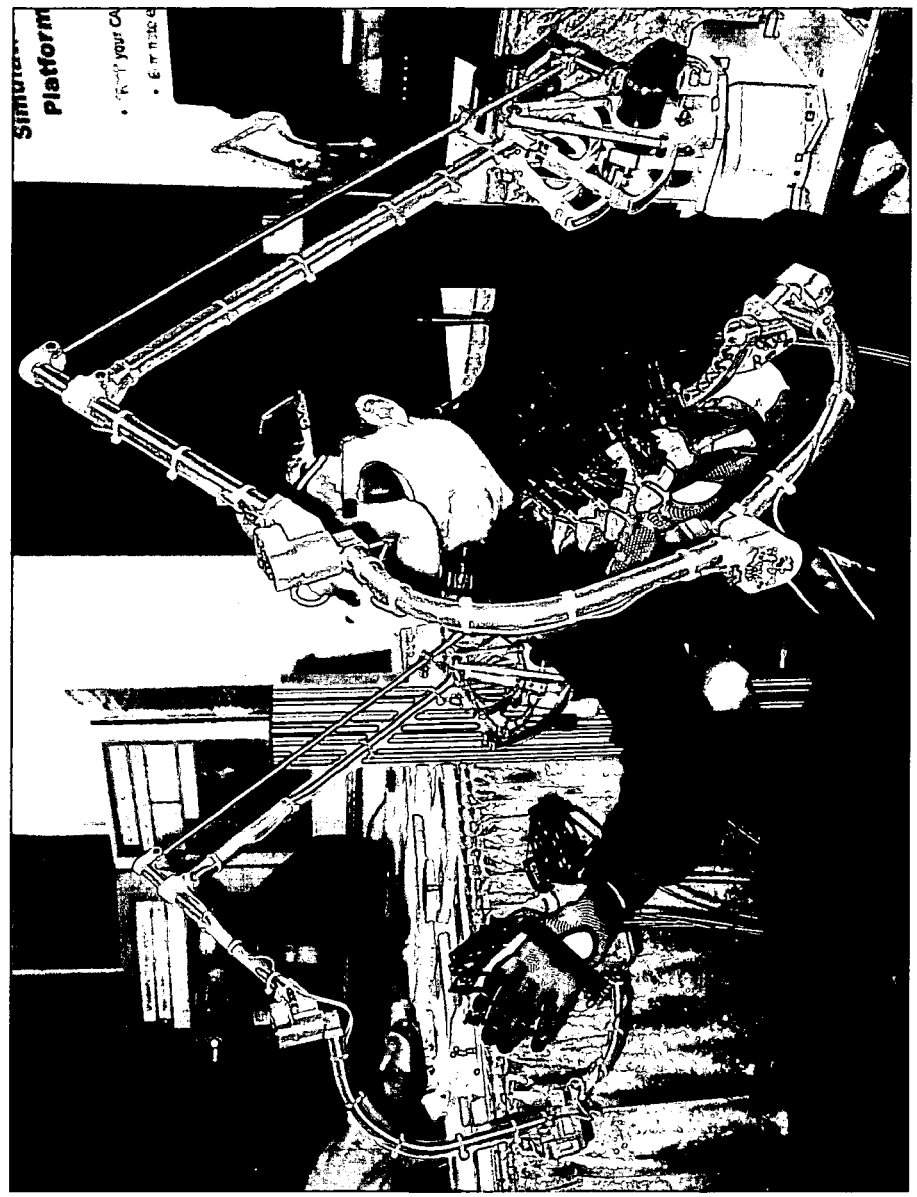
FIG. 10 shows an example of a bi-manual haptic device, according to the present invention, with 22 degrees-of-freedom.

The present invention has now been described in accordance with several exemplary embodiments, which are intended to be illustrative in all aspects, rather than restrictive. Thus, the present invention is capable of many variations in detailed implementation either in hardware and/or software, which may be derived from the description contained herein by a person of ordinary skill in the art. For example, the invention can be applied to human interface devices with a higher number of degrees of freedom. It would for example be possible to use the controller on a haptic device that actuates the tip of each finger of a user's hand (see FIG. 10).

The mathematical description herein regarding the drift controller (drift=velocity*offset) could be varied or generalized. For example, one could add a constant to this equation where the constant defines the magnitude of the drift, i.e. drift=constant*velocity*offset. This constant can for example be adjusted by the operator. This constant may typically vary between 0.0 and 1.0 (0-100%). Another variation to the drift controller is to define a function or operator to the velocity and/or offset. Useful examples of functions or operators are cosine, sine, tangent, or a power.

In one embodiment the added drift to be unperceiveable to a human operator is below 5.0 m/s. As a person of average skill would readily appreciate the threshold between unperceivable and perceivable is dependent on the operator and other factors such as the size of the device and the type of application. An application for virtual drawing (CAD) may require higher control accuracy of the cursor (avatar) than an application for entertainment such as a game where faster motions of the hand or human body are performed.

Figure 9:
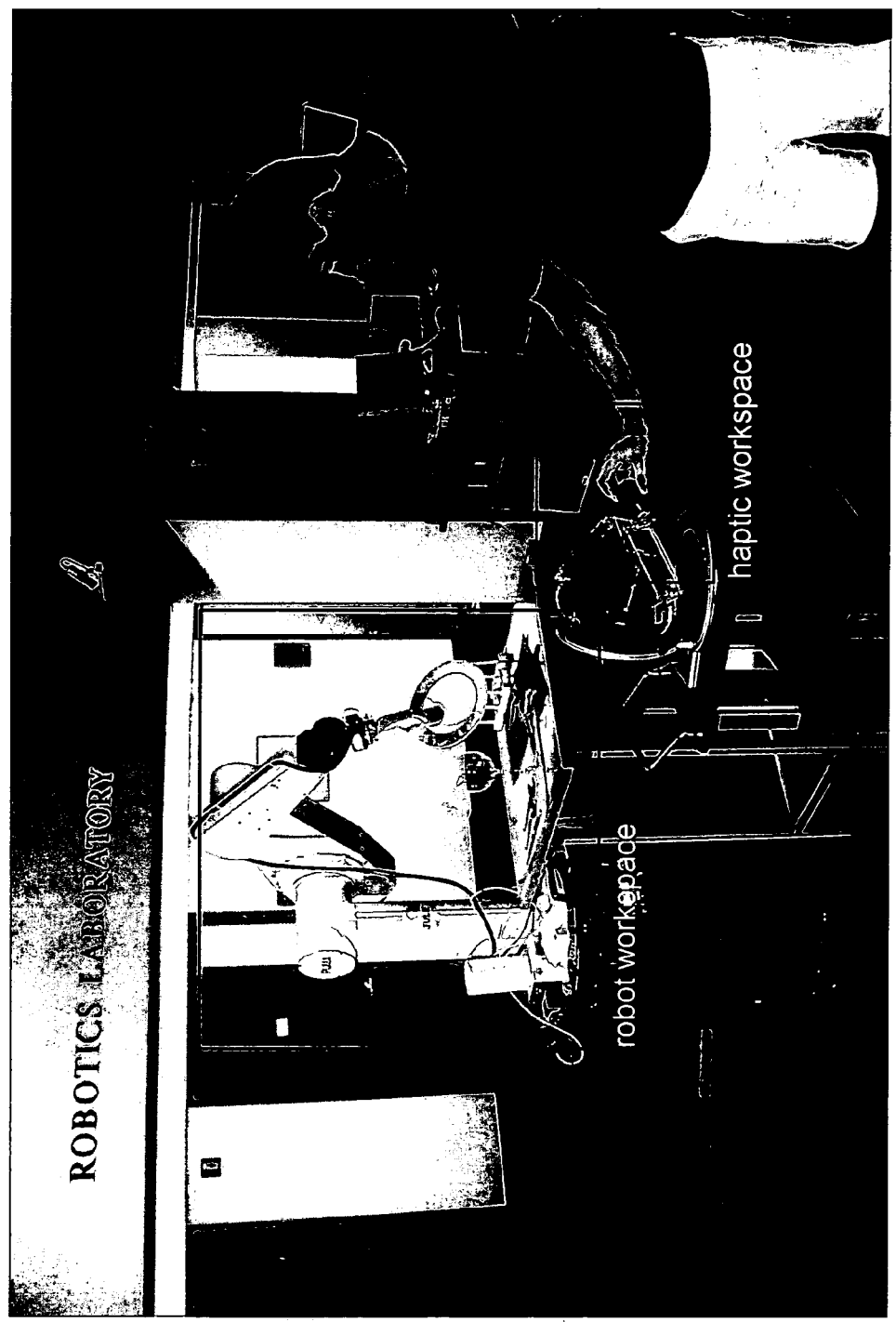
FIG. 9 shows an example, according to the present invention, of teleoperating a gripper of a robot manipulator through a haptic device. The difference in size between the robot workspace and haptic workspace is clear from this illustration.
Figure 11:
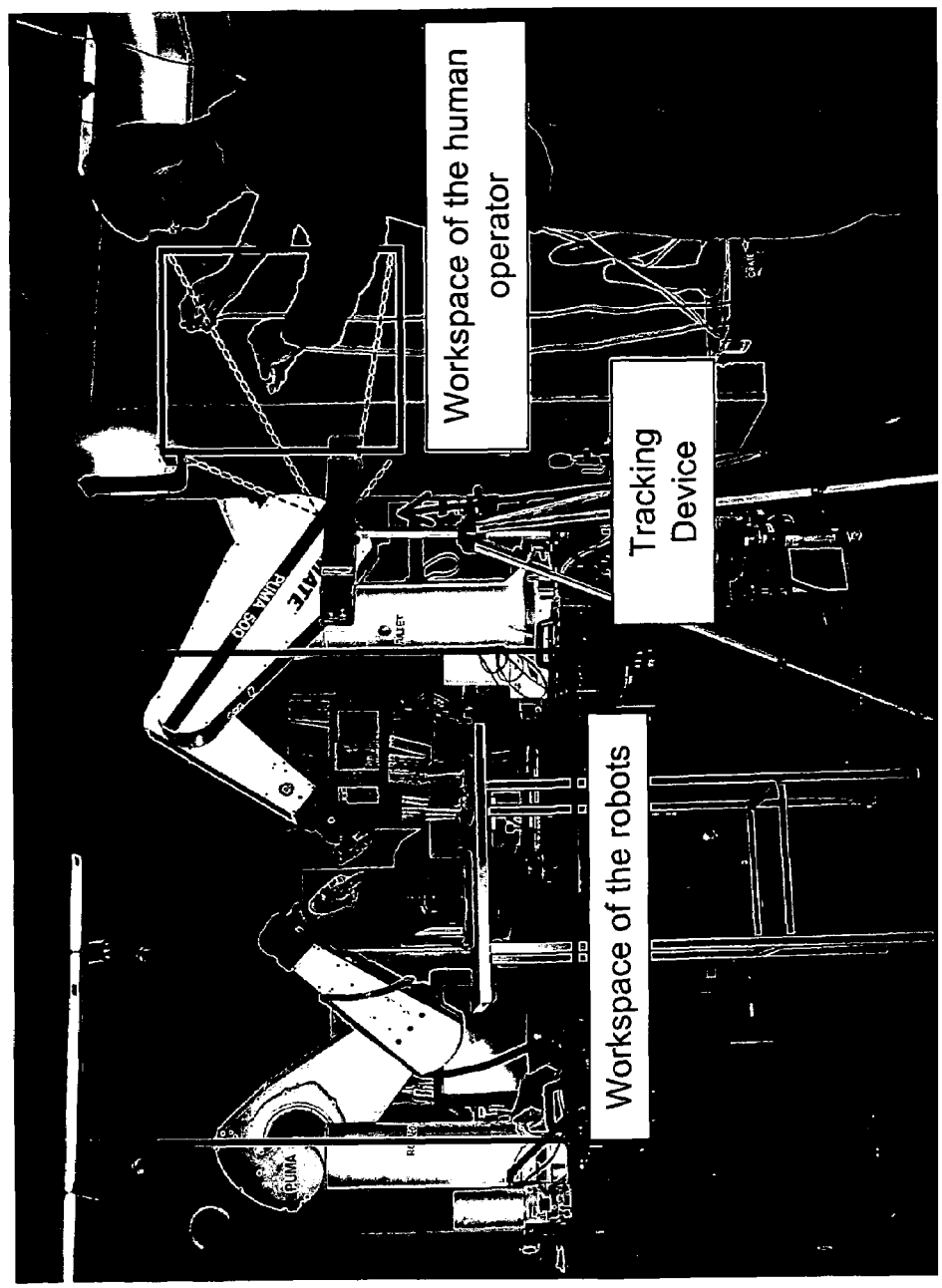
FIG. 11 shows an example, according to the present invention, of teleoperating a gripper of two robot manipulators through a tracking device which detects the position of the user's hands.
Figure 12:
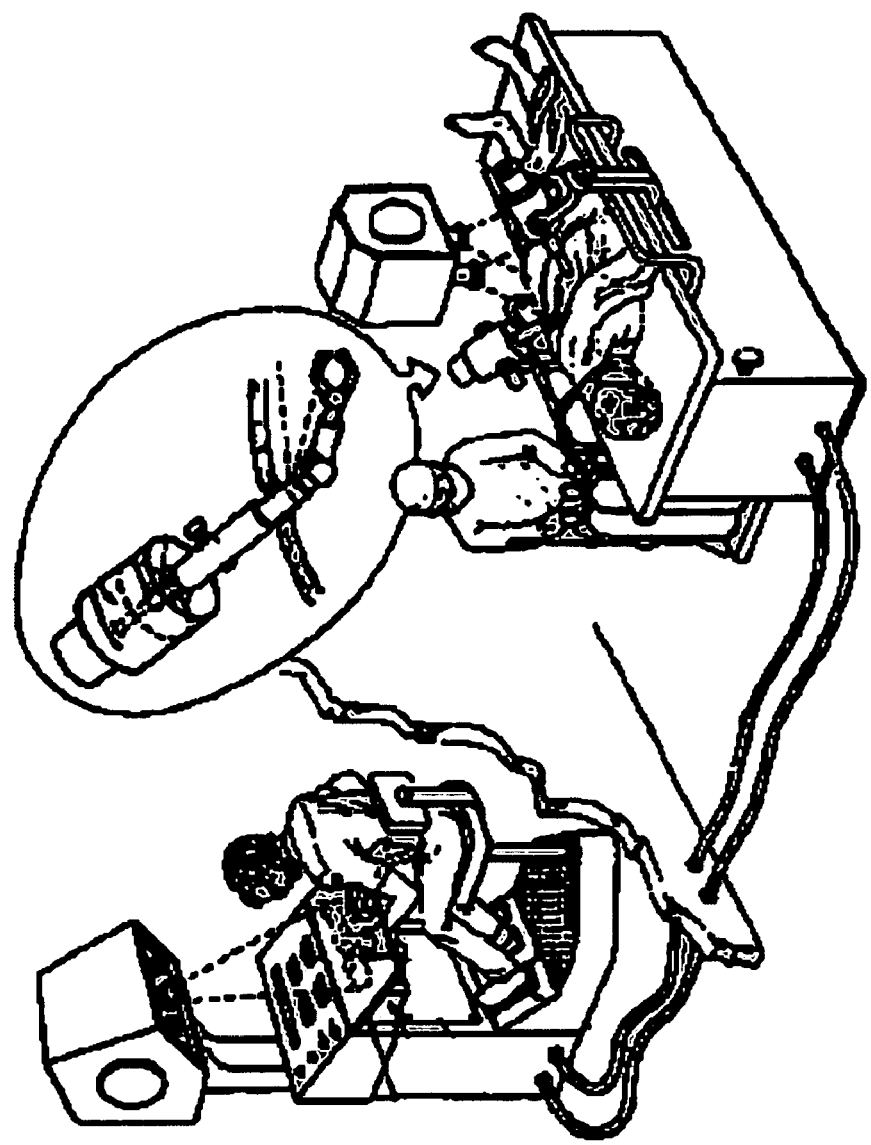
FIG. 12 shows an example of a teleoperation application involving two surgical robots commanded by two haptic devices to which the present invention can be applied.

Another variation is that the human interface device could have multiple end-effectors that could control one or more graphical objects. One tracking device could also track multiple control points as shown in FIG. 11 where the operator is holding one tracked marker in each hand. Applications may also include the use of one or both hands and also other body parts (such as the head) to control the behavior of an avatar on the computer screen. The same strategy can be used to a control the position of one or more end-effectors or grippers on a multi-degrees-of-freedom robot manipulator. (See FIGS. 9, 11-12).

Still another variation relates to the application of non-haptic devices such as tracking devices as a person of average skill would readily appreciate. For example, the teaching of the invention readily apply to uses with tracking pads, touch pads, trackballs, pointing sticks, lightpens, joysticks, head pointers, eye tracking devices, digitizing tablets (which use a stylus) and data gloves that translate the user's movements to computer gestures. In the example of a touch pad, the operator would interact with the touch pad and thereby controls a cursor on a computer screen.

In general, the application areas of the invention are to devices or systems that include a human interface. More specifically, one could identify the haptic systems and the non-haptic systems. Application fields are for example Human-computer interaction (HCI), man-machine interaction (MMI), interactive simulations, interactive computer games, remote robot teleoperation, robotic surgery and wearable computing.

All such variations are considered to be within the scope and spirit of the present invention as defined by the following claims and their legal equivalents.

What is claimed is:

1. A human interface system, comprising:
   (a) a human interface device with a physical workspace and an end-effector movable in said physical workspace;
   (b) a computer system having a graphical display defining a virtual workspace, said computer system connected to said human interface device and said end-effector capable of controlling a graphical object on said graphical display within said virtual workspace; and
   (c) a drift controller for adding drift to the position of said graphical object, wherein said drift controller adds said drift in a direction away from a defined point in said virtual workspace and wherein the amount of said added drift is defined as the product of the instant velocity of said end-effector and the offset position of said end-effector from a defined point of origin within said physical workspace.

2. The human interface system as set forth in claim 1, wherein said added drift is below 5 m/s with respect to said physical workspace.

3. The human interface system as set forth in claim 1, wherein the amount of said added drift is further multiplied by a constant.

4. The human interface system as set forth in claim 1, wherein said instant velocity is to the power of n, or where a function is applied to said instant velocity.

5. The human interface system as set forth in claim 1, wherein said offset is to the power m, or where a function is applied to said offset.

6. The human interface system as set forth in claim 1, wherein said added drift is an imperceptible drift to the user operating said end-effector.

7. The human interface system as set forth in claim 1, wherein said added drift does not disturb the perception of the graphical object within said virtual workspace.

8. The human interface system as set forth in claim 1, wherein said defined point in said virtual workspace is the center of said virtual workspace.

9. The human interface system as set forth in claim 1, wherein said defined point or origin of said physical workspace is the center of said physical workspace.

10. The human interface system as set forth in claim 1, wherein said human interface system is a haptic system, and wherein said human interface device is a haptic device.

11. A workspace expansion system for a tracking device, comprising:
    (a) an input tracking device movable within a physical workspace;
    (b) a computer system having a graphical display defining a virtual workspace, said computer system connected to said input tracking device and said input tracking device capable of controlling a graphical object on said graphical display within said virtual workspace; and
    (c) a drift controller for adding drift to the position of said graphical object, wherein said drift controller adds said drift in a direction away from a defined point in said virtual workspace and wherein the amount of said added drift is defined as the product of the instant velocity of said input tracking device and the offset position of said input tracking device from a defined point of origin within said physical workspace.

12. The workspace expansion system as set forth in claim 11, wherein said added drift is below 5 m/s with respect to said physical workspace.

13. The workspace expansion system as set forth in claim 11, wherein the amount of said added drift is further multiplied by a constant.

14. The workspace expansion system as set forth in claim 11, wherein said instant velocity is to the power of n, or where a function is applied to said instant velocity.

15. The workspace expansion system as set forth in claim 11, wherein said offset is to the power m, or where a function is applied to said offset.

16. The workspace expansion system as set forth in claim 11, wherein said added drift is an imperceptible drift to the user operating said end-effector.

17. The workspace expansion system as set forth in claim 11, wherein said added drift does not disturb the perception of the graphical object within said virtual workspace.

18. The workspace expansion system as set forth in claim 11, wherein said defined point in said virtual workspace is the center of said virtual workspace.

19. A method for expanding a workspace in a human interface system, comprising:
    (a) providing a human interface device with a physical workspace and an input device movable in said physical workspace;
    (b) providing a system having a workspace, said system connected to said human interface device and said input device capable of controlling one or more objects or control points on said system within said workspace; and
    (c) adding drift to the position of said one or more graphical objects or said one or more control points, wherein said drift controller adds said drift in a direction away from a defined point in said workspace and wherein the amount of said added drift is defined as the product of the instant velocity of said input device and the offset position of said input device from a defined point of origin within said physical workspace.

* * * * *